(12) United States Patent
Bergstrsöm et al.

(10) Patent No.: US 7,104,706 B2
(45) Date of Patent: Sep. 12, 2006

(54) HEATING DEVICE

(75) Inventors: Dag Bergstrsöm, Ekerö (SE); Hans Johansson, Bromma (SE); Moshen Janbakhsh, Stockholm (SE); Torsten Lund, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 182 days.

(21) Appl. No.: 10/489,773

(22) PCT Filed: Sep. 19, 2002

(86) PCT No.: PCT/SE02/01697

§ 371 (c)(1),
(2), (4) Date: Aug. 31, 2004

(87) PCT Pub. No.: WO03/025648

PCT Pub. Date: Mar. 27, 2003

(65) Prior Publication Data

US 2005/0031282 A1    Feb. 10, 2005

(30) Foreign Application Priority Data

Sep. 20, 2001 (SE) .................................. 0103133

(51) Int. Cl.
| | |
|---|---|
| *G02B 6/36* | (2006.01) |
| *G02B 6/02* | (2006.01) |
| *F27D 11/00* | (2006.01) |
| *H05B 3/02* | (2006.01) |
| *H05B 3/06* | (2006.01) |
| *H05B 3/34* | (2006.01) |
| *H05B 3/58* | (2006.01) |
| *G02B 6/255* | (2006.01) |
| *G02B 6/00* | (2006.01) |
| *B23K 13/08* | (2006.01) |
| *B23K 15/02* | (2006.01) |

(52) U.S. Cl. ........................ 385/99; 385/53; 385/88; 385/90; 385/92; 385/95; 385/96; 385/123; 385/134; 385/147; 219/385; 219/482; 219/536; 219/538; 219/520; 219/521; 219/523; 219/524; 219/528; 219/535

(58) Field of Classification Search ............... 385/53, 385/88, 90, 92, 95, 96, 99, 123, 134, 147; 219/385, 482, 520, 521, 523, 524, 528, 535, 219/536, 538
See application file for complete search history.

(56) References Cited

U.S. PATENT DOCUMENTS 4,460,820 A * 7/1984 Matsumoto et al. ........ 219/385
4,680,449 A     7/1987 Yamada et al.

FOREIGN PATENT DOCUMENTS

WO         00/79321 A1     12/2000

OTHER PUBLICATIONS

International Preliminary Examination Report mailed Jul. 23, 2003 in corresponding PCT Application No. PCT/SE02/01697.
International Search Report mailed Dec. 17, 2002 in corresponding PCT Application No. PCT/SE02/01697.

* cited by examiner

*Primary Examiner*—Brian Healy
*Assistant Examiner*—Jerry Martin Blevins
(74) *Attorney, Agent, or Firm*—Nixon & Vanderhye, P.C.

(57) ABSTRACT

The present invention relates to a heating device having at least a first heating element 102 for heating at least one protective sleeve 105, 602 arranged around at least a first uncoated optical fiber section 501, 603. Said sleeve 105, 602 being arranged to shrink when exposed to heat to form a protecting member tightly enclosing said uncoated optical fiber section 501, 603. The at least first heating element is flexible, and arranged to take at least a first open state and a second substantially closed state. Said first open state is suitable for inserting and removing said protecting sleeve and fiber into and out off said heating device. Said heating element, in said second state, substantially surrounds said sleeve to form an enclosure around said sleeve, so that said heating element radiates heat around substantially the complete circumference of said sleeve.

14 Claims, 3 Drawing Sheets

HEATING DEVICE

This application is the US national phase of international application PCT/SE02/01697, filed in English on 19 Sep. 2002, which designated the US. PCT/SE02/01697 claims priority to SE Application No. 0103 133-5 filed 20 Sep. 2001. The entire contents of these applications are incorporated herein by reference.

TECHNICAL FIELD

The present invention relates to the heating and shrinking of protective sleeves over the bare optical fibers in a finished splice.

BACKGROUND OF THE INVENTION

In the fiber optical communication technology to a higher and higher extent, in addition to loose or separate optical fibers, optical ribbon fibers or "ribbons" are used, i.e. optical fibers which by an outer enclosure are held to form a unit of type ribbon cable, i.e. a flat fiber assembly including a plurality of optical fibers extending in parallel to each other. Such ribbon fiber typically contains 2, 4, 6, 8, or 12 individual fibers.

When splicing optical fibers and ribbon fibers often fusion, also called welding or fusion welding, is used in devices particularly designed for this purpose. When splicing two different fibers to each other the different enclosures and protective layers are first removed. This can be made in a single step so that the naked surface of the optical fibers appears after the operation. Thereupon the naked fibers are cleaned, cut off, placed in the fiber-splicing device and are spliced to each other.

Thereafter a separate protective sleeve is placed over the splicing region. Such protective sleeves are usually heat-shrinkable pieces of tubing made of a suitable polymer material. Such a piece of tubing is then placed over the spliced portion of the fiber and the protective sleeve and the spliced portion is moved to a heating device, in which the protective sleeve is heated to make it shrink and tightly seal the spliced portion. The two operations, splicing using fusion and applying the protective sleeve tightly around the spliced portion, are most often executed in two separate devices but may equally well be executed in a single device with two operations, cf. WO 00/65388 OPTICAL FIBER SPLICING APPARATUS assigned to Telefonaktiebolaget LM Ericsson.

It is also possible to automate the process steps of stripping, cleaning, cutting, splicing through fusion, recoating and testing, through for instance robot technology. In this situation, each process step is a working station and a robotic arm moves each fiber between each station. All stations are working simultaneously wherefore the working time for the longest process step sets the limit for the speed of the total process. It is therefore important to minimise the time taken for each step. The time taken for splicing is approximately around 50 seconds. State of the art ovens or heating devices for recoating have difficulties with reaching these times and therefore constitutes a bottleneck in the process. It is of course also important to minimise each process step if an operator manually handles the fibers. Thus, the above process, described having a robot, can also be carried out with an operator moving the fiber between each process step.

These devices are also at times, in a mobile form, brought about to places where no mains is available, thus requiring their own power supply. Therefore, it is important to minimise power consumption.

SUMMARY OF THE INVENTION

It is an object of the present invention to provide an oven or heating device for applying a tight sealing around a spliced portion of a fiber having a reduced process time and reduced power consumption.

The above mentioned objects are achieved by providing a heating device comprising a heating element which is flexible and is able to substantially surround and enclose a protective sleeve to be applied around a spliced portion of an optical fiber so that the sleeve is evenly and effectively heated. By this arrangement it is possible to have an oven or heating device with low mass so that the time for heating the oven to an appropriate temperature is reduced, to heat the sleeve effectively so as to reduce the time spent on shrinking and to have an arrangement which allows for quick cooling of the sleeve after heating so that the finished product can safely be removed and the next fiber be applied.

According to a preferred embodiment, the flexible heating element is constituted by a flexible, thermostable foil having resistance threads over substantially the complete area of the foil, and holes arranged to ventilate the sleeve after heating and shrinking so that the time for cooling of the sleeve to safe handling temperature is reduced. The resistance threads are arranged to generate heat on application of a current. A power controlling means preferably controls the current through the threads, or the voltage across it, and through which it is possible to exactly control the temperature of the foil.

According to another preferred embodiment of the invention the flexible heating element is adapted to reduce the radius of the enclosure surrounding said sleeve during the shrinking of the sleeve, when the sleeve reduces its size through shrinking.

The heating element, according to yet a further preferred embodiment, is arranged to bear against the sleeve during the heating and shrinking process, and to stay in contact with the sleeve during the shrinking. This can preferably be arranged by spring-loading the heating element so that the heating element will, with some force, bear against the sleeve and reduce the radius of the enclosure surrounding said sleeve during the shrinking of the sleeve so that the heating element bear against the sleeve.

BRIEF DESCRIPTION OF THE DRAWINGS

The present invention will become more fully understood from the detailed description of embodiments of the present invention given hereinbelow and the accompanying FIG. 1, which is given by way of illustration only, and thus is not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
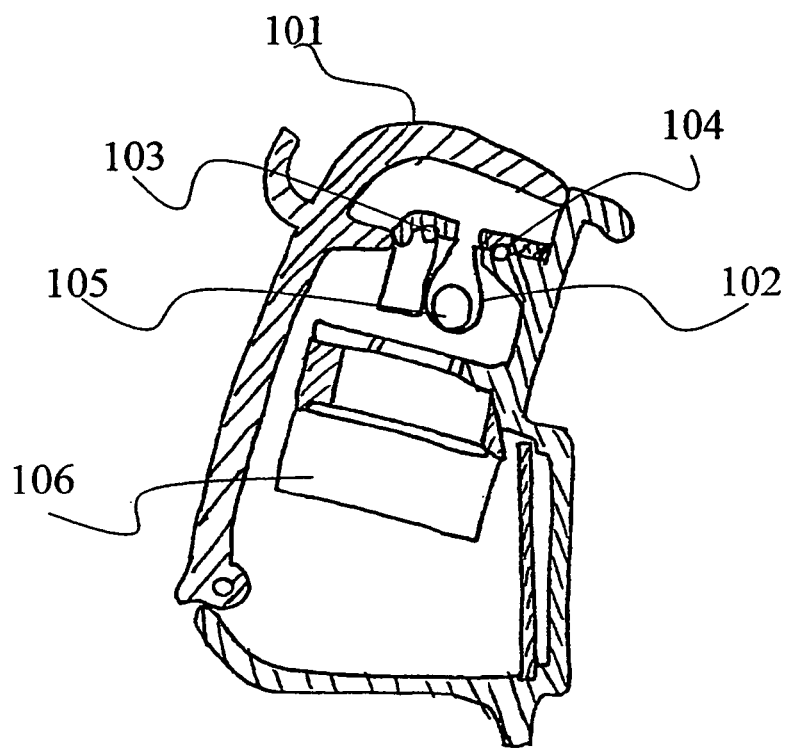
FIG. 1 shows a schematic cross-section of a first preferred embodiment of the heating device according to the invention.

FIG. 1 shows a schematic cross-section of a heating device of a first embodiment according to the invention with a lid 101 in a closed position. The heating element 102, having elongated copper staffs, 103 and 104, respectively, is in a closed state suitable for maximum transfer of generated heat to the sleeve 105. A fan is denoted 106. The fan is turned on during a cooling stage.

Arranged in the heating device are also suitable electronic devices (not shown) to control the heating element 102, so that the heating element 102 takes a preferable temperature during the whole process with minimum power consumption and a rapid process, for instance between 180 and 230 degrees Celsius.

When the lid of the heating device 101 is open the heating element 102 will open up as indicated in FIG. 5d.

Figure 2:
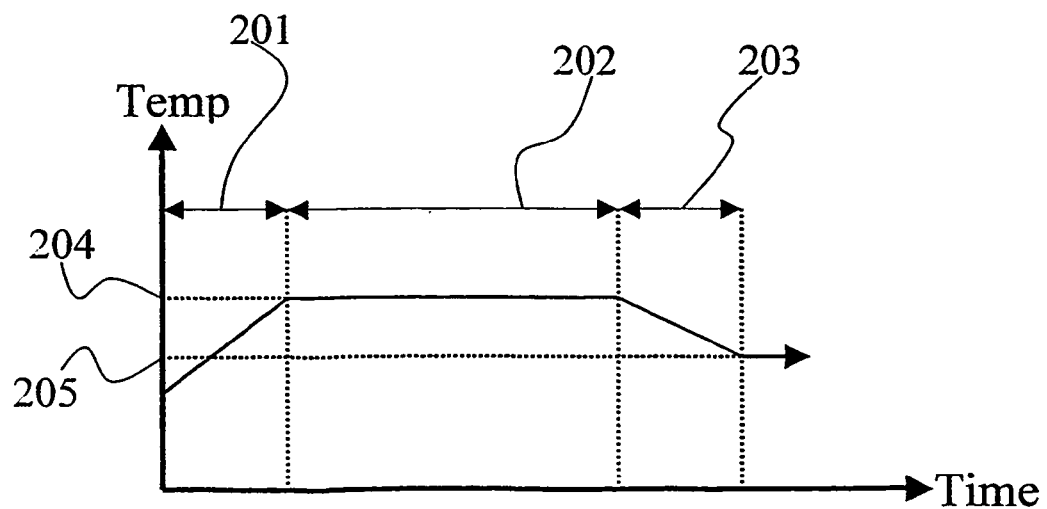
FIG. 2 shows different process steps during application of a sleeve to a spliced fiber.

FIG. 2 shows a diagram disclosing the process for application of a shrinkable sleeve over a spliced fiber, said sleeve being provided with glue and a stiff pin. The process is divided into three different stages, namely a warming up stage 201, a melting stage 202, and a cooling stage 203. To be able to achieve a rapid process each of these stages should be as short as possible. To achieve a rapid warming up stage 201, the mass of the heating device should be kept small, so that the shrinking temperature, denoted 204 is reached quickly. The warming up stage 201 takes approximately 5 seconds. During the melting stage 202 it is important that the heat generated by a heating element is transferred as effectively as possible to the sleeve to achieve a rapid shrinking. The melting stage 202 takes approximately 25 seconds and is preferably time controlled by suitable control equipment (not shown). Finally during the cooling stage 203 an effective cooling is important to rapidly reach a safe handling temperature 205, which also is the temperature when the fan is turned off.

Figure 3:
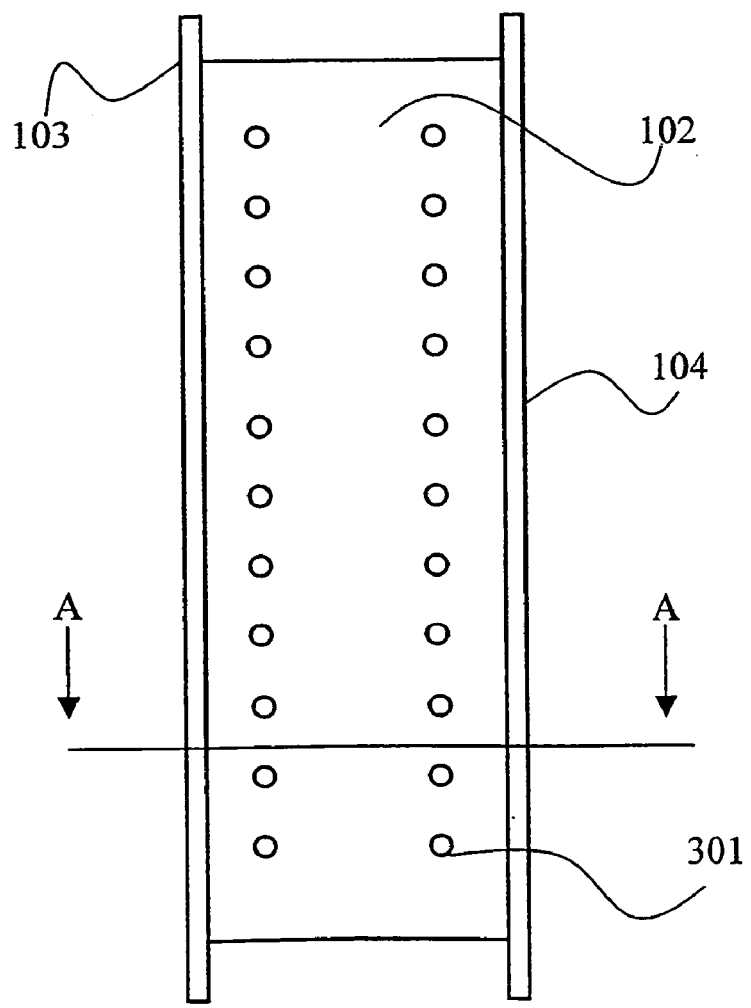
FIG. 3 shows a top view of the heating element in FIG. 1.

FIG. 3 shows the heating element 102 in plan view. The copper staffs are denoted as in FIG. 3 with 103 and 104 respectively. Twelve orifices 301 in the heating element are used for heat transfer. These orifices 301 reduce the time for cooling the sleeve, once it has been shrunk tightly around the spliced fibre. The heating element has resistance threads embedded (not shown). These resistance threads generate heat when a current is applied, the stronger the current, the more heat is generated. It is thus possible to control, with a suitable electronic device, the generated heat, and thus the temperature to achieve an effective melting temperature.

Figure 4:
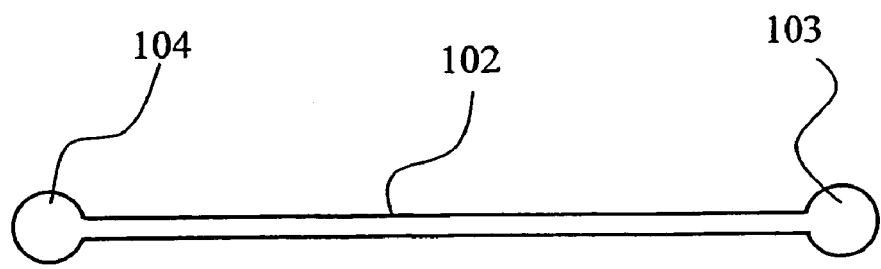
FIG. 4 shows a cross-section of a heating element in FIG. 5.

FIG. 4 shows a cross-section of the heating element in FIG. 3 taken across the line denoted A.

Figure 5:
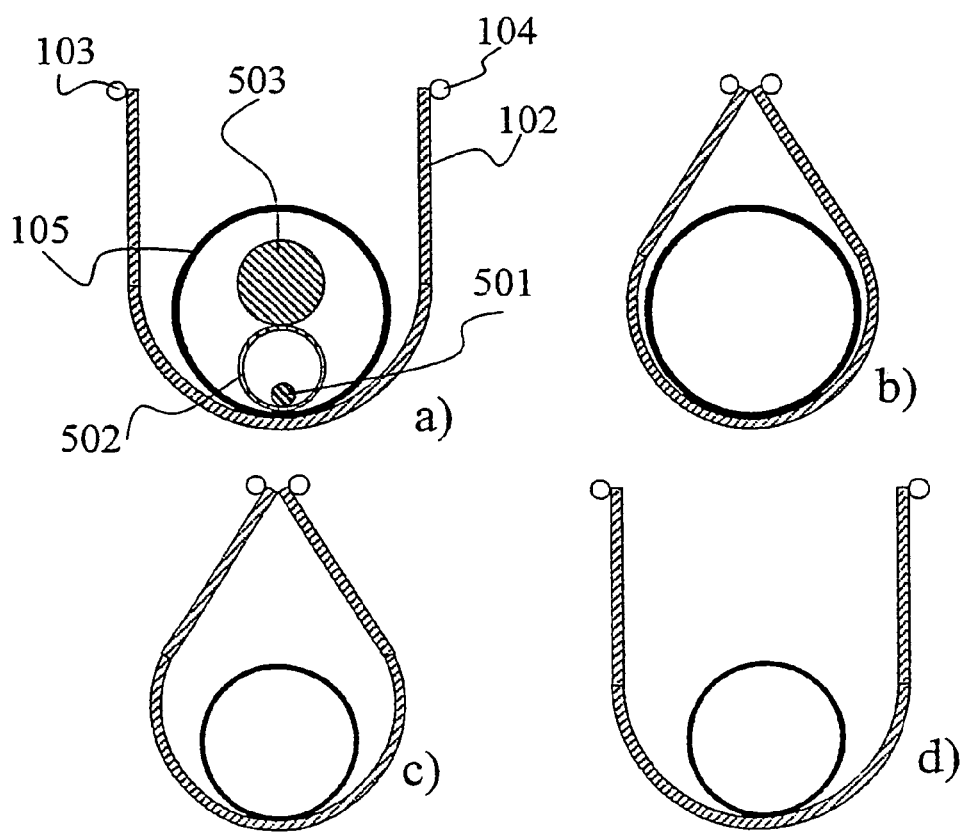
FIGS. 5a–d show four cross-sections of the heating element during different process steps according to the first preferred embodiment of the invention.

FIGS. 5a–d shows a cross-section of the heating element at four different stages during the process of shrinking the sleeve 105 to tightly seal a spliced fiber 501. In FIG. 5a, the fiber 501, with the sleeve 105, has been inserted into the heating element 102. In FIG. 5a a pin 503 is shown as well as a glue tube 502. The pin 503 is arranged to secure a stiff splice so that unnecessary load is avoided on the splice. To not obscure the general ideas with unnecessary details the heating device is not shown in FIG. 5 and the pin 503 and the glue tube 502 is left out of FIGS. 5b–5d. The heating element 102 is in an open position to allow for easy insertion of the fiber and sleeve. During warming up and melting, stages, 201 and 202 respectively in FIG. 2, the heating element takes a closed position to effectively transfer the generated heat to the sleeve, as shown in FIG. 5b. FIG. 5c shows the fiber 501 at the end of the melting stage, where the sleeve 105 fit tightly around the fiber 501. It should be noted that the finished arrangement not necessarily need to be circular but may take other forms such as oval. At the end of the process the heating element is again opened, as well as the heating device (not shown) so that the fiber 501 with sleeve 105 can be removed and a further spliced fiber with sleeve inserted, as is shown in FIG. 5d.

Figure 6:
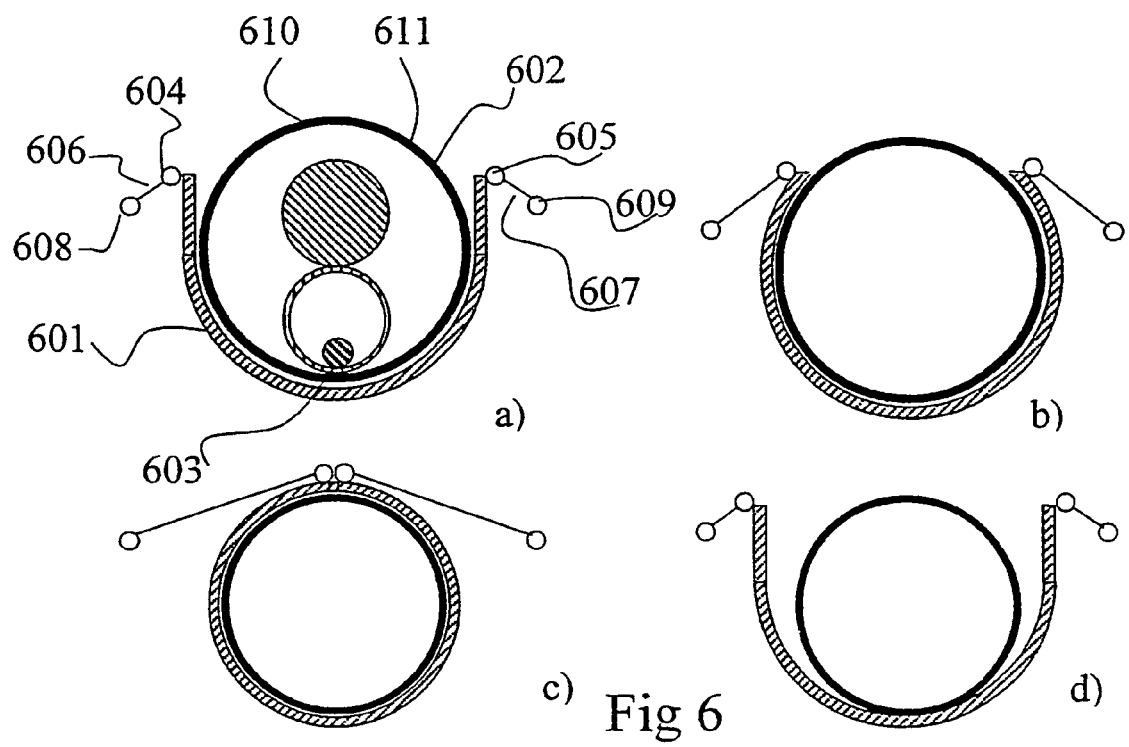
FIGS. 6a–d show four cross-sections of the heating element during different process steps according to a second preferred embodiment of the invention.

FIGS. 6a–d shows a heating element 601 of second preferred embodiment according to the invention. FIG. 6a shows the protective sleeve 602 and the fiber 603 introduced into the heating element 601, as well as a pin 610 and a glue tube 611. The pin 610 and the glue tube are left out of FIGS. 6b–6c for clarity. A first pair of copper staffs, denoted 604 and 605, respectively, is connected to the heating element 601 and, through resilient members 606 and 607, respectively to a second pair 608 and 609 of movable staffs.

The second staffs 608 and 609 are moved so that the first staffs 604 and 605 resiliently bears against the sleeve 602 thus forcing the heating element 601 to bear against the sleeve 602, FIG. 6b. Since the heating element 601 is in contact with the sleeve 602 a very effective heat transfer between the heating element 601 and the sleeve 602 occur. When the sleeve 602 shrinks, during the melting stage 202 in FIG. 2, the resilient force on the first staffs 604 and 605 forces the heating element 601 to follow the shrinking sleeve 602. Thus, the heating element 601 continues to bear against the sleeve 602 during the complete melting stage 202 in FIG. 2, as shown in FIG. 6c. This secures a very effective heat transfer during the complete melting stage. After the process is finished, the heating element 601 is opened to allow for removal of the heating element 601 and introduction of a new spliced fiber to be protectively covered with a sleeve.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A heating device having at least a first heating element for heating at least one protective sleeve arranged around at least a first uncoated optical fiber section, said sleeve being arranged to shrink when exposed to heat to form a protecting member tightly enclosing said uncoated optical fiber section, characterised in that said at least first heating element is flexible, and arranged to take at least a first open state and a second substantially closed state, that said first open state is suitable for inserting and removing said protecting sleeve and fiber into and out off said heating device, and that said heating element, in said second state, substantially surrounds said sleeve to form an enclosure around said sleeve, so that said heating element radiates heat around substantially the complete circumference of said sleeve.

2. The heating device according to claim 1, wherein said heating element is arranged to bear against at least a major portion of the circumference of said sleeve in said second position.

3. The heating device according to claim 1, wherein said heating element is arranged to reduce the radius of the enclosure surrounding said sleeve during the shrinking of the sleeve.

4. The heating device according to claim 2, wherein said heating element is arranged to bear against at least a major portion of the circumference of said sleeve during substantially the whole shrinking process.

5. The heating device according to claim 4, wherein said heating element is spring loaded so as to bear against said sleeve during said shrinking process.

6. The heating device according to claim 1, wherein said heating device comprises a cooling arrangement for quickly cooling said sleeve.

7. The heating device according to claim 1, wherein said at least first heating element comprises a flexible, thermostable foil having resistance threads over the surface, said resistance threads being arranged to heat-up the foil when exposed to a current.

8. The heating device according to claim 7, wherein said foil comprises holes for quickly releasing heat from said sleeve when the heating element has been turned off.

9. The heating device according to claim 1, wherein a pin and glue means is arranged inside said sleeve.

10. A method for applying a protective sleeve around an uncoated optical fiber section comprising the steps of:
    applying said optical fiber section, having a shrinkable protective sleeve arranged around it, into a flexible heating element taking a first open state,
    closing said heating element, by bending, so that said heating element substantially surrounds to form an enclosure around said protective sleeve,
    applying a controlled current to said heating element, so that said heating element takes a preferred temperature, and radiates heat around substantially the complete circumference of said sleeve to shrink said sleeve,
    turning said current off after a specific time period,
    opening said heating element, so that said fiber having a protective sleeve, is easily accessible.

11. The method according to claim 10, wherein said heating element is arranged to bear against at least a major portion of said circumference when said heating element is closed.

12. The method according to claim 10, further comprising the step of reducing the radius of the enclosure of said heating element during the shrinking of said sleeve.

13. The method according to claim 10, further comprising the step of cooling the sleeve after said current is turned off.

14. The method according to claim 10, wherein said heating element is a flexible thermostable foil having resistance threads over the surface, said resistance threads being arranged to heat-up the foil when exposed to current, and where said foil comprises holes.

* * * * *